(12) United States Patent
Clauwaert et al.

(10) Patent No.: US 8,425,997 B2
(45) Date of Patent: Apr. 23, 2013

(54) COBALT BEARING POLYMERIC COMPOSITIONS

(75) Inventors: Eddy Clauwaert, Brugge (BE); Bert-Jan Kamphuis, Vosselaar (BE)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 13/063,275

(22) PCT Filed: Sep. 14, 2009

(86) PCT No.: PCT/EP2009/006631
§ 371 (c)(1),
(2), (4) Date: May 10, 2011

(87) PCT Pub. No.: WO2010/028851
PCT Pub. Date: Mar. 18, 2010

(65) Prior Publication Data
US 2011/0206879 A1    Aug. 25, 2011

Related U.S. Application Data

(60) Provisional application No. 61/136,596, filed on Sep. 18, 2008.

(30) Foreign Application Priority Data

Sep. 12, 2008 (EP) .................... 08016087

(51) Int. Cl.
*B32B 1/08* (2006.01)
*B32B 1/00* (2006.01)
*C08G 79/00* (2006.01)
*C08L 85/00* (2006.01)

(52) U.S. Cl.
USPC .......... 428/36.9; 428/35.7; 525/389; 528/9

(58) Field of Classification Search .......... 428/36.9, 428/35.7; 525/190, 289; 528/9
See application file for complete search history.

(56) References Cited

U.S. PATENT DOCUMENTS 4,057,529 A * 11/1977 Leo et al. .............. 524/184
4,340,515 A    7/1982 Frassek et al.

FOREIGN PATENT DOCUMENTS

| EP | 0059883 | 9/1982 |
| EP | 0065476 | 11/1982 |
| GB | 972804 | 10/1964 |
| GB | 1232194 | 5/1971 |
| GB | 1338930 | 11/1973 |
| GB | 1393005 | 5/1975 |
| WO | WO 01/38426 | 5/2001 |
| WO | WO 02/28944 | 4/2002 |

OTHER PUBLICATIONS

Extended European Search Report, issued in EP 08016087.2, dated Jun. 26, 2009.

(Continued)

*Primary Examiner* — Erik Kashnikow
(74) *Attorney, Agent, or Firm* — Brinks Hofer Gilson & Lione

(57) ABSTRACT

The invention relates to polymeric cobalt bearing compounds, in particular for use as metal-rubber adhesion promoters (RAPs) in tires, belts and hoses. Known active substances are a.o. cobalt stearates, naphthenates, resinates, decanoates, boro-decanoates and many other forms of acylates. While these substances appear to enhance the metal-rubber adhesion, all of them also come with significant drawbacks, a.o. linked to the relatively high bioavailability of cobalt in these substances. The invention concerns more particularly a polymer comprising Co-carboxylate sequences, with a Co content of at least 3% by weight, and with a mean molecular weight of more than 2000. Several synthesis methods, allowing to reach relatively high Co concentrations in the polymer, illustrate the invention. The invented polymers show a strongly reduced bioavailability of Co compared to currently available products, as demonstrated by aqueous leaching tests. As RAPs, they perform similarly to commercial products, as shown by pullout tests.

6 Claims, 2 Drawing Sheets

OTHER PUBLICATIONS

Figure 1:
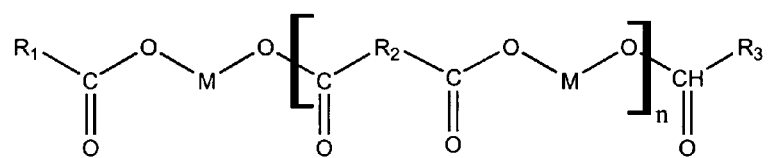

International Search Report, issued in PCT/EP2009/006631, dated Apr. 1, 2010.

Patton et al., "Alkyd Resin Technology," Interscience Publ., (1962), pp. 82, 83, 106, and 107.

* cited by examiner

COBALT BEARING POLYMERIC COMPOSITIONS

This application is a National Stage application of International Application No. PCT/EP2009/006631, filed Sep. 14, 2009, which claims the benefit of U.S. Provisional Application No. 61/136,596, filed Sep. 18, 2008, the entire contents of which are hereby incorporated herein by reference. This application also claims priority under 35 U.S.C. §119 to European Patent Application No. 08016087.2, filed Sep. 12, 2008, the entire contents of which is hereby incorporated herein by reference.

The invention relates to polymeric cobalt bearing compounds, in particular for use as metal-rubber adhesion promoters (RAPs) in such products as tires, belts and hoses.

Many formulations have been tested for this type of application. According to current practice, cobalt bearing substances are typically used. Cobalt indeed appears to have an essential function in achieving the desired adhesion. Known active substances are a.o. cobalt stearates, naphthenates, resinates, decanoates, boro-decanoates, and many other forms of acylates. Examples can be found in GB 1338930, EP 0065476, U.S. Pat. No. 4,340,515, and GB 972804.

While these substances appear to enhance the metal-rubber adhesion, all of them also come with significant drawbacks. Most of these RAPs show e.g. a relatively high bioavailability of cobalt, as indicated by aqueous leaching tests. This is a concern in view of the well known toxicity of cobalt. Other RAPs, such as those based on natural products, may offer a rather variable quality only.

As RAPs are added to the rubber, they may, under certain circumstances, and as an undesired side effect, interfere with the characteristics of the rubber. One therefore generally tends to minimize the additions of RAPs, while nevertheless ensuring that a sufficient cobalt concentration is obtained in the rubber. This leads to the use of RAPs with a relatively high cobalt concentration, a feature tending to further exacerbate their toxicity.

The goal of the present invention is therefore to provide a RAP formulation combining a high cobalt concentration with a low solubility of cobalt in aqueous media.

To this end, and according to the invention, a family of high cobalt (Co) concentration polymers is presented, which offer low cobalt solubility, yet provide excellent properties as adhesion promoters.

The polymer according to the invention comprises Co-carboxylate sequences, with a Co content of at least 3% by weight, and with a mean molecular weight of more than 2000.

A polymer with a Co concentration of more than 10%, or even of more than 12%, is preferred.

It is understood that the repeating Co-carboxylate sequences correspond to polymer molecules with at least 2, and, preferably, 3 or more Co-dicarboxylate groups, which form an integral part of the backbone of the polymer molecule.

In another embodiment, the polymer further comprises one ore more borate groups.

The polymer preferably contains residual unsaturation.

The present invention further concerns an unvulcanized elastomeric composition comprising the abovementioned polymer and rubber. It also concerns a vulcanized composition comprising the abovementioned polymer.

Another embodiment of the present invention concerns a rubber-metal composite obtainable by vulcanization of the abovementioned unvulcanized elastomeric composition in the presence of one ore more metallic parts. The so obtained object may typically be a tire, a belt, or a hose.

A further embodiment concerns the use of the abovementioned polymer as rubber-metal adhesion promoter, in particular for the preparation of a composite comprising an unvulcanized elastomeric composition and one ore more metallic parts.

A further embodiment concerns the use of the abovementioned unvulcanized composite for the manufacture of a vulcanized rubber-metal composite, in particular for the manufacture of a tire, a belt, or a hose.

There is also disclosed a process for the synthesis of the abovementioned polymer, comprising Co-carboxylate sequences, with a Co content of at least 3% by weight, and with a mean molecular weight of more than 2000. The process comprises the steps of:

selecting a first amount of x mole of one or more monocarboxylic acid or of a corresponding precursor, with C4 to C36;

selecting a second amount of y mole of an n-basic polycarboxylic acid or of a corresponding precursor with C4 to C36;

selecting a third amount of z mole of a $Co^{2+}$ source;

whereby $1.0 < (x+ny)/2z < 1.2$ and $0 < x/y < 1$; and, mixing and heating the carboxylic acids and the $Co^{2+}$ source at 100 to 250° C., thereby eliminating volatile reaction byproducts.

Synthesis temperatures above 250° C. are to be avoided as this would result in the decomposition of carboxylic acids. It is therefore advisable to select polymers having a melting point of less than 250° C., as this will allow for proper stirring of the reaction products using common industrial equipment, while minimizing thermal decomposition. Moreover, polymers with a mean molecular weight of less than 10000 are preferred to guarantee a sufficiently low viscosity during synthesis.

The newly developed products comprise an adequately high Co content. They nevertheless show a low Co solubility in aqueous media, while demonstrating an excellent activity as RAP. It thus appears that embedding the Co in polymer chains significantly reduces the water-solubility of the Co, without impairing its activity as a RAP.

The synthesis methods are based on the reaction between mono- and poly-carboxylic acids, and a basic cobalt reactant such as cobalt hydroxide. Also, borate groups can be substituted for part of the carboxylate groups. The resulting polymers typically show a wide range of molecular weights, as demonstrated by Gel Permeation Chromatography (GPC).

For the GPC determinations, a PL-GPC-50 from Polymer Laboratories® is used. Columns are filled with polystyrene gel as stationary phase, and the response is calibrated using standard supplied polystyrene solutions. Samples are dissolved in tetrahydrofurane, which is also used as an eluent. Detection is performed by the standard RI-detector.

The mean molecular weight is determined by the standard calculation methods such as commonly used in the formulation of polyesters and oil-modified polyesters. Such a method is described in "Alkyd Resin Technology", T. C. Patton, Interscience Publ. 1962, pp. 82, 83, 106, and 107.

The synthesis method allows for many modifications and substitutions. This can be put to use to adjust the physical and chemical properties of the resulting compounds. Indeed, when using only mono- and di-carboxylic acids, low melting, linear structures are obtained. The use of tri- or tetra-carboxylic acids results in three-dimensional structures, generally also showing a higher melting point. The melting point is a relevant parameter, defining the preferred technique for homogeneously mixing the desired amount of RAP with the rubber.

Unsaturated polymeric molecules can be synthesized by choosing correspondingly unsaturated carboxylic acids as starting products. The so-obtained unsaturated polymers tend to co-vulcanize, thereby becoming an integral part of the rubber. This reduces the risk of a detrimental influence of the added RAP on the final characteristics of the rubber.

The invented compounds can further be used individually or as mixtures, at the discretion of the user. The substances can further be modified by mixing them with reactive or non reactive diluents.

Figure 2:
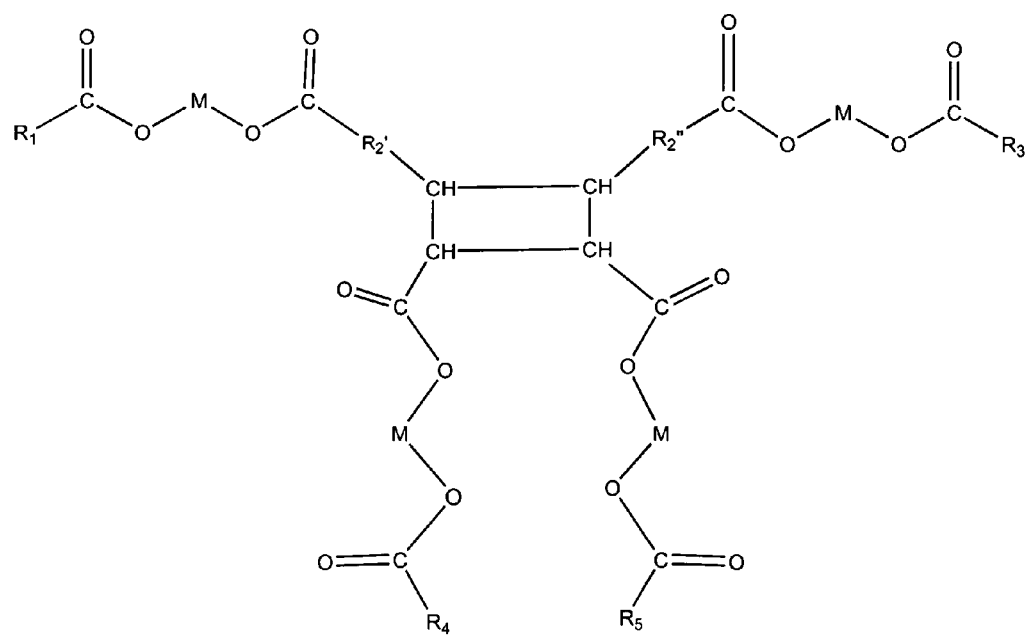
Figure 3:
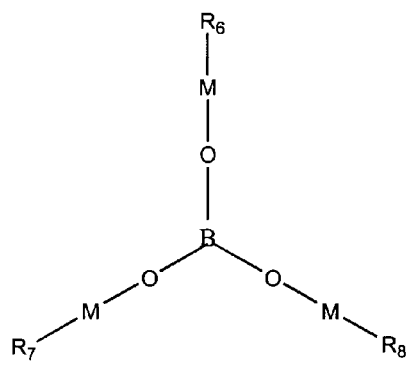

FIGS. 1 to 3 show examples of specific structures believed to be obtained according to the examples below. The atom designated by M, is cobalt.

FIG. 1 shows the structural formula of essentially linear polymers. R1, R2 and R3 are alkyl groups with 5 to 36 carbon atoms, linear or ramified, unsaturated or saturated. R2 is the central part of a di-carboxylic acid. Example 1 illustrates the synthesis of such a compound.

FIG. 2 shows the structural formula of tri-dimensional, ramified polymers. R1, R2, R3, R4 and R5 are alkyl groups with from 5 to 36 carbon atoms, linear or ramified, unsaturated or saturated. R2', R3', R2", and R3" are the side parts of R2 after diene addition. Example 2 illustrates the synthesis of such a compound.

Figure 3A:
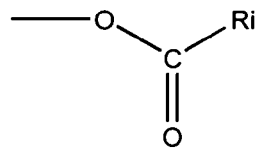
Figure 3B:
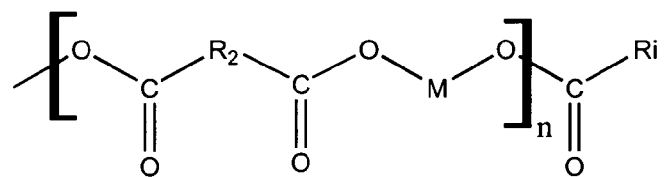
Figure 3C:
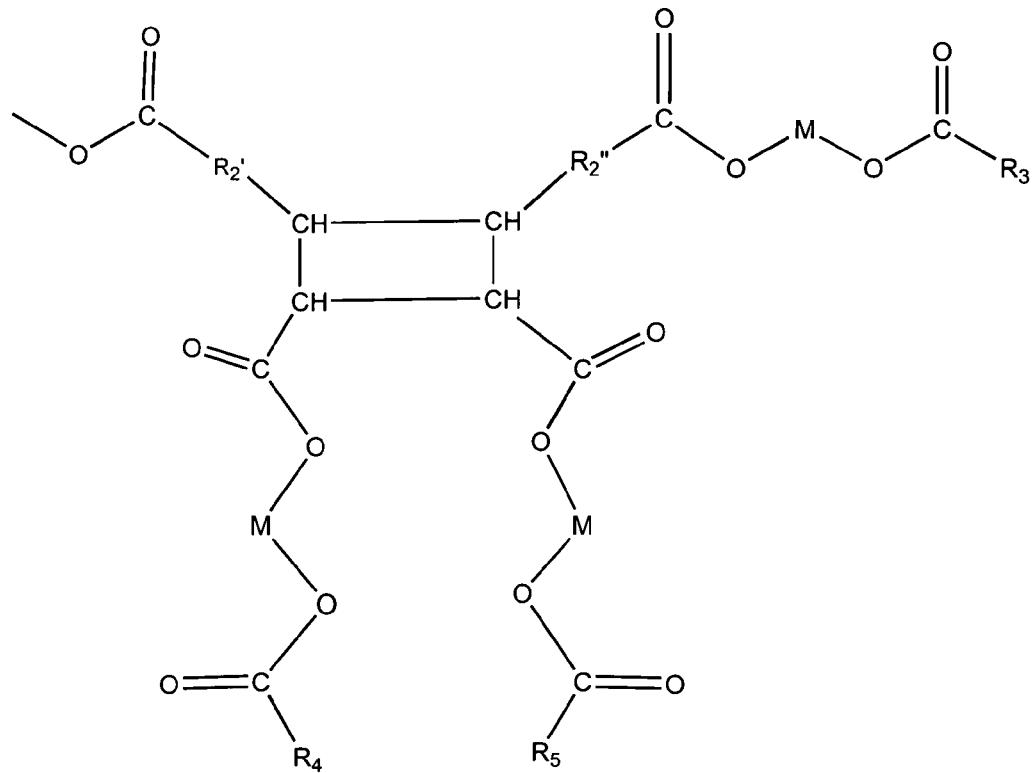

FIG. 3 shows the structural formula of polymers containing boron. R6, R7 and R8, are substituents according to the structures of FIGS. 3a, 3b and 3c, with Ri is R1, R2, or R3. Example 3 illustrates the synthesis of such a compound.

EXAMPLE 1

The apparatus used for the synthesis comprises a round-bottomed glass reaction vessel of 2 l capacity, equipped with a stirrer, heating means, a water cooled condenser, and with provisions for a nitrogen flow.

Are added:
350 g neo-decanoic acid; and,
590 g dimeric fatty acids.

The mixture is stirred under nitrogen and the temperature is raised to 120° C. 190 g of cobalt hydroxide is added in small portions over a period of 6 h, during which the reaction temperature is slowly raised to 160 to 170° C., so as to maintain the viscosity within the range for the stirrer to operate normally. The reaction mixture is kept at 180° C. for 2 h, to finalize the reaction.

The obtained product is a homogeneous, dark bluish molten mass. It is then poured out to cool to a friable solid, which is then ground or pelletized.

The melting point, as determined by the Ball & Ring method, is 120° C. The product contains 11.2% Co (by weight). Its mean molecular weight is 3700.

EXAMPLE 2

Are added in an apparatus similar to that of Example 1:
576 g of tall-oil fatty acids; and,
98 g of maleic anhydride.

The mixture is stirred while the temperature is raised to 90° C. Is then added:
40 g of water.

The reaction mix is heated to about 100° C. for 30 minutes. Then, is added in small portions:
190 g of cobalt hydroxide.

After the addition of the first 50 g of cobalt hydroxide, the temperature is slowly raised to 120° C., thereby boiling off the excess and reaction water. Then addition is continued over a period of 6 h, increasing the temperature as needed to allow stirring. With the final addition, the temperature reaches about 250° C. This temperature is maintained for an additional 2 h.

The obtained product is a dark bluish molten mass, which is poured out to cool as a dark bluish friable solid product. It can be ground to a powder or pelletized.

The melting point is 220° C., and the Co concentration 14.6%. The mean molecular weight is 2800.

EXAMPLE 3

Are added in an apparatus similar to that of Example 1:
365 g of neo-decanoic acid;
490 g of dimeric fatty acids; and,
15.25 g of glacial acetic acid.

The components are mixed and the temperature raised to 80° C. Then, is added in small portions:
180 g of cobalt hydroxide.

During the addition, the temperature is raised as necessary for the normal working of the stirrer. Finally, a temperature of 165° C. is reached. At this temperature the reaction mix is kept for 1 h.

Then, is added slowly:
39.40 g of tributyl orthoborate ester.

The temperature is slowly increased to 230° C., where it is kept for 1 h.

The obtained product is a dark bluish molten mass, which is poured out to cool as a dark bluish friable solid product. It can be ground to a powder or pelletized.

The melting point is 150° C., and the Co concentration 11.4%. The mean molecular weight is 4900.

EXAMPLE 4

Experiments are performed to determine the aqueous solubility of the Co in the invented polymers. These tests are relevant as indicators for the bioavailability of Co.

Pure water, as well as a physiologic aqueous solution containing 0.9 g/l NaCl, are used as a solvent. The leaching tests are conducted according to the OECD-105 standard flask method, as described in the OECD Guideline for the Testing of Chemicals, adopted on 27 Jul. 1995, and in the Official Journal of the European Communities L 383 A, 54-62 (1992).

The solubility of 3 typical polymers according to the invention is compared to that of 3 commercial products. The results are summarized in Table 1.

TABLE 1

| Solubility of Co in water and in 0.9% NaCl solution | | |
|---|---|---|
| Product | Solvent | Co (mg/l) |
| Polymer ex Example 1 | Water | 65 |
|  | 0.9% NaCl | 40 |
| Polymer ex Example 2 | Water | 170 |
|  | 0.9% NaCl | 164 |
| Polymer ex Example 3 | Water | 44 |
|  | 0.9% NaCl | 20 |
| Co-acetylacetonate (*) | Water | 1600 |
|  | 0.9% NaCl | 1400 |
| Co-boro-neo-decanoate (*) | Water | 990 |
|  | 0.9% NaCl | 1080 |
| Manobond ® 680 C. (*) | Water | 830 |
|  | 0.9% NaCl | 790 |

(*) Comparative example

The polymers according to the invention release only very limited amounts of Co. Results of less than 200 mg/l are considered as acceptable.

EXAMPLE 5

In this example, the effectiveness of the invented polymers as RAPs is assessed and compared to that of commercial products.

To this end, the maximum rubber to brass-coated steel adhesion force is determined for rubber compounds containing different RAPs. All RAPs are added at a level equivalent to 0.2 phr (per hundred rubber) Co, which is a typical concentration.

Table 2 shows the composition of the rubber, while Table 3 shows the results in terms of pullout forces.

TABLE 2

Composition of the rubber

| Product | Relative amounts (phr) |
| --- | --- |
| Natural rubber SMR CV20 | 100 |
| Carbon HAF 326 | 50 |
| Zinc oxide | 8 |
| Stearic acid | 0.5 |
| TMQ (1) | 1 |
| DCBS (2) | 1 |
| Sulfur (ground) | 5 |
| Aromatic processing oil | 4 |

(1) 2,2,4-trimethyl-1,2-dihydroquinoline polymer (anti-aging agent)
(2) N,N-Dicyclohexyl-2-benzthiazlyl sulphonamide (accelerator)

The rubber compounds, including the RAP, are prepared according to industry standard procedures in a 1.5 l nominal capacity internal mixer. The dump temperature is 157 to 162° C. The sulfur and DCBS are mixed according to industry standard procedures at a temperature of 60° C. on a two-roll open mixer.

Test pieces with 10 cords each are made according to Russian Standard GOST 14863-69, and subsequently aged by keeping them in water with 5% NaCl at 23° C. for 7 days. The vulcanization temperature is 160° C., for a time of t95+8 minutes. This corresponds to about 14 to 18 minutes, depending on the compound. The cord used is Bekaert® 3*7*0.22 brass coated steel.

The maximum forces needed to pull the wire out of the rubber, both before and after aging of the test pieces, are reported in Table 3.

TABLE 3

Pullout forces

| Product | Pullout force (N) | |
| --- | --- | --- |
| | Before aging | After aging |
| Blank (no RAP) (*) | 195 +/− 8 | 195 +/− 4 |
| Polymer ex Example 1 | 471 +/− 26 | 429 +/− 19 |
| Polymer ex Example 2 | 592 +/− 20 | 501 +/− 31 |
| Polymer ex Example 3 | 480 +/− 24 | 406 +/− 12 |
| Manobond ® 680 C. (*) | 536 +/− 22 | 518 +/− 26 |

(*) Comparative example

The results show a significant enhancement of adhesion when using the RAPs according to the invention, both before and after aging, comparable in magnitude to an industry standard product. This level of performance is considered as more than adequate.

EXAMPLE 6

This example is performed with materials and in conditions similar to those of Example 5, yet with the following differences:

Bekaert® 7*4*0.22 wire is used;
vulcanization temperature and time are 162° C. and 15.5 minutes;
RAP concentration is 0.15 phr Co;
the test method is according to ASTM 2229-04;
the number of wires per test amounts to 7;
aging is performed at 100° C. in air for 72 h.

The rubber composition is also slightly different from Example 5, according to Table 4.

TABLE 4

Composition of the rubber

| Product | Relative amounts (phr) |
| --- | --- |
| Natural Rubber TSR 10 | 100 |
| Carbon HAF 326 | 55 |
| Zinc Oxide | 8 |
| Stearic acid | 0.5 |
| 6PPD | 1 |
| TMQ (1) | 1 |
| DCBS (2) | 1.1 |
| Sulfur Crystex OT 20 | 5 |
| SP 1068 Resin | 2 |

(1) 2,2,4-trimethyl-1,2-dihydroquinoline polymer (anti-aging agent)
(2) N,N-Dicyclohexyl-2-benzthiazlyl sulphonamide (accelerator)

The maximum forces needed to pull the wire out of the rubber, both before and after aging of the test pieces, are reported in Table 5.

TABLE 5

Pullout forces

| Product | Pullout force (N) | |
| --- | --- | --- |
| | Before aging | After aging |
| Blank (no RAP) (*) | 364 +/− 27 | 235 +/− 14 |
| Polymer ex Example 1 | 708 +/− 53 | 568 +/− 50 |
| Polymer ex Example 2 | 611 +/− 69 | 546 +/− 91 |
| Polymer ex Example 3 | 644 +/− 63 | 647 +/− 21 |
| Co-boro-neo-decanoate (*) | 806 +/− 50 | 626 +/− 38 |
| Co-resinate (*) | 824 +/− 97 | 695 +/− 66 |

(*) Comparative example

The results show a significant enhancement of adhesion when using the RAPs according to the invention, both before and after aging, comparable in magnitude to industry standard products. This level of performance is considered as more than adequate.

The invention claimed is:

1. An unvulcanized elastomeric composition, comprising a polymer comprising Co-carboxylate sequences, with a Co content of at least 3% Co by weight, and with a mean molecular weight of more than 2000 and rubber.

2. A rubber-metal composite obtainable by vulcanization of the composition of claim 1, in the presence of one or more metallic parts.

3. The rubber-metal composite of claim 2, wherein said composite is a tire, a belt, or a hose.

4. The unvulcanized elastomeric composition of claim 1, wherein the polymer further comprises one or more borate groups.

5. A rubber-metal adhesion promoter comprising a polymer comprising Co-carboxylate sequences with a cobalt content of at least 3% Co by weight and a mean molecular weight of more than 2000.

6. The rubber-metal adhesion promoter of claim 5, wherein the polymer further comprises one or more borate groups.

* * * * *

UNITED STATES PATENT AND TRADEMARK OFFICE
CERTIFICATE OF CORRECTION

PATENT NO. : 8,425,997 B2
APPLICATION NO. : 13/063275
DATED : April 23, 2013
INVENTOR(S) : Clauwaert et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 58 days.

Signed and Sealed this
Eighth Day of September, 2015

Michelle K. Lee
*Director of the United States Patent and Trademark Office*